United States Patent [19]

Meerman

[11] Patent Number: 4,857,092
[45] Date of Patent: * Aug. 15, 1989

[54] METHOD OF DENSIFYING A PREFORMED POROUS BODY OF A MATERIAL THE MAIN CONSTITUENT OF WHICH IS $SiO_2$

[75] Inventor: Wilhelmus C. P. M. Meerman, Eindhoven, Netherlands

[73] Assignee: U.S. Philips Corp., New York, N.Y.

[*] Notice: The portion of the term of this patent subsequent to Mar. 1, 2005 has been disclaimed.

[21] Appl. No.: 933,310

[22] Filed: Nov. 21, 1986

Related U.S. Application Data

[63] Continuation of Ser. No. 694,569, Jan. 24, 1985, abandoned.

[30] Foreign Application Priority Data

Nov. 7, 1984 [NL] Netherlands .......................... 8403380

[51] Int. Cl.⁴ ............................................. C03B 23/20
[52] U.S. Cl. ......................................... 65/18.4; 65/2; 65/18.1; 65/144
[58] Field of Search ...................... 65/2, 13, 18.1, 18.2, 65/18.4, 144

[56] References Cited

U.S. PATENT DOCUMENTS

| | | | |
|---|---|---|---|
| 4,378,985 | 4/1983 | Powers | 65/13 |
| 4,450,333 | 5/1984 | Andrejco et al. | 65/13 |
| 4,514,205 | 4/1985 | Darcangelo et al. | 65/13 |
| 4,552,576 | 11/1985 | Hara et al. | 65/3.12 |
| 4,578,098 | 3/1986 | Paek et al. | 65/13 |
| 4,617,041 | 10/1986 | Meerman | 65/3.12 |

FOREIGN PATENT DOCUMENTS

| | | | |
|---|---|---|---|
| 58-161939 | 9/1983 | Japan | 65/13 |
| 2129418 | 5/1984 | United Kingdom . | |

OTHER PUBLICATIONS

"New Optical Fibre Fabrication Method" by K. Susa et al., Electronics Letters, vol. 18, No. 12, Jun. 10, 1982, pp. 499–500.

*Primary Examiner*—Arthur Kellogg
*Attorney, Agent, or Firm*—Ernestine C. Bartlett

[57] ABSTRACT

Porous bodies of a material comprising $SiO_2$ as the main constituent are heated by passing a zone of high temperature through the body. This high temperature zone is obtained by irradiation with light of a wavelength which is obsorbed by the porous part of the body, but which is not absorbed by the densified part of the body. The device preferaby comprises a rotatable radiation source surrounding the body to be densified.

7 Claims, 1 Drawing Sheet

METHOD OF DENSIFYING A PREFORMED POROUS BODY OF A MATERIAL THE MAIN CONSTITUENT OF WHICH IS SIO₂

This is a continuation of application Ser. No. 694,569, filed Jan. 24, 1985 now abandoned.

The invention relates to a method of densifying a preformed porous body of a material having a main constituent of $SiO_2$ to form a body of an optically transparent glass by passing a zone of high temperature through the body.

BACKGROUND OF THE INVENTION

It is generally known to increase the density of porous bodies mainly consisting of $SiO_2$ by heating the bodies in a furnace.

The major problem in this method is to prevent gas bubbles from being included in the glass during densification. It has therefore been already suggested to pass a softening front through the body while using an annular furnace. In this case heating of the densified body by convection cannot be avoided. (See, for example, German published Patent Application DE-OS No. 3 240 355). When this method is used, small gas bubbles or vacuum cavities (vacuoles) may also still be present after densification. It is therefore recommended in this method to ensure that the gas bubbles are filled with helium or hydrogen. In a subsequent thermal treatment the gases may diffuse away out of the glass. The vacuoles must then be driven out by a thermal treatment.

In this method the possibility exists for the glass to be heated at a high temperature for such a period of time that crystallisation of the glass may occur if the major constituent is $SiO_2$. It is the object of the invention to provide a method of increasing the density of a porous pre-formed body of a material having a main constituent of $SiO_2$ in which the formed transparent glass is not essentially heated.

A material having a major constituent of $SiO_2$ is to be understood to mean in this connection a material which comprises an excess of $SiO_2$ and further admixtures (dopants) in a quantity as is usual either to reduce or to increase the refractive index of silica glass by a percentage as is usual for the application of the glasses in optical fibers. The material is also to be understood to include a material which comprises only $SiO_2$ including inevitable impurities.

SUMMARY OF THE INVENTION

This object is achieved by means of a method which is characterized in that the densification is carried out with infrared radiation of a wavelength smaller than a wavelength which is absorbed essentially by the transparent glass, with the radiation source and the porous body being moved relatively with respect to each other with means being provided to prevent the body in the nondensified condition and after densification from being heated by convection and/or by infrared radiation of a wavelength which is absorbed by the transparent glass.

In the method according to the invention the property is used that infrared radiation of a wavelength smaller than that which is absorbed essentially by transparent glass having a main constituent of $SiO_2$ (smaller than approximately 3 $\mu$m) is absorbed substantially in the porous body in those places where reflection or scattering occurs. This enables the density of the body to be increased by means of a sharply progressing zone of a high temperature when the radiation source and the porous body are moved relatively with respect to each other. The gases to be driven out get sufficient escape possibilities so that a thermal after-treatment of the densified body is not necessary. In the method according to the invention the formed transparent glass is also prevented from being heated in a manner which might result in crystallisation.

The means which prevent the body in the non-densified condition and after densification from being heated by convection and/or by infrared radiation having a wavelength which is absorbed by the bright glass ($\lambda > 3$ $\mu$m) may consist, for example, of a screen of transparent silica glass present between the radiation source and the body to be sintered. In a preferred embodiment of a method according to the invention the densification is carried out with a radiation source which surrounds the body to be densified on all sides and which is accommodated in a space between two tubes with the inner tube being of silica glass and the outer tube being cooled.

By making the inner tube of silica glass, infrared radiation having a wavelength $\lambda > 3$ $\mu$m which may be emitted by the radiation source is absorbed. A rise in temperature of the silica glass tube may in this case be prevented by passing a gas through the space between the tubes. As a result of this, heat of convection is also dissipated. An extra effect is obtained by subjecting the outer tube to a forced cooling with, for example, water. The gas which is passed through the space between the tubes may be, for example, a gas which does not react chemically with the radiation source, for example, nitrogen, helium or argon, or mixtures of these gases. If the source of radiation does not emit radiation having a wavelength of $\lambda > 3$ $\mu$m the space between the two holes can be evacuated. The radiation source may be, for example, of carbon, graphite, zirconium oxide, molybdenum, tungsten, and the like. The radiation member may be heated inductively or by direct current passage.

The method according to having an invention is particularly suitable for densifying porous bodies the outer circumference of the shape of a body of revolution. The bodies may, for example, consist of hollow or solid cylinders from which tubes and solid rods, respectively, are formed upon densifying.

In the densification of porous bodies having an outer circumference which has the shape of a body of revolution, a radiation source is preferably used in the form of a hollow cylinder which omnilaterally surrounds the body to be densified.

In spite of a careful centering of the porour body within the cylindrical radiation body it has been found in practice that a non-uniform heating of the body to be densified sometimes occurs. This non-uniform heating may give rise to warping of the densified body. A non-uniform heating, however, can be avoided to a considerable extent by rotating the body during the densification. During the densification the centering may be supervised visually by means of a mirror which is placed outside the heating device in the elongation of the axis at an angle of 45° with respect to the axis of the body to be densified. Since the body is rotating, however, it is difficult to establish visually how a deviation, if any, from the centering of the body has to be corrected.

In a preferred embodiment of the invention in which this difficulty is avoided a radiation source is used in the form of a hollow cylinder surrounding the porous body to be densified with the body and the hollow cylinder being positioned with respect to each other in such manner that the axis of the hollow cylinder coincides with the axis of the body with the hollow cylinder being rotated about its axis and with the non-rotating body and the hollow cylinder being moved relatively to each other in a direction parallel to the axis. In this embodiment of the method a device is used in which the radiation source in the form of a hollow cylinder is heated inductively by means of an RF-coil.

During densification the centering of the stationary body to be densified can simply be controlled and corrected.

Preformed porous bodies obtained by means of a so-called sol-gel process in particular can be densified to form bright bodies of glass by means of the method according to the invention. In the sol-gel process, an alkoxy silane in alcoholic solution is gelled by the addition of water. The resulting gel is then dried and densified (see, for example, Electronics Letters, June 10th, 1982, Vol. 18, No. 12, pp. 499–500).

The porous body may be of doped $SiO_2$, for example, $GeO_2$-doped $SiO_2$. If a doping is used which gives rise to absorption of radiation at a wavelength $\lambda < 3$ $\mu$m it is recommended to provide between the radiation source and the porous body a radiation screen of silica glass which comprises the same doping as the porous body in a quantity which is sufficient to absorb the undesired part of the spectrum as much as possible. In this manner it is achieved that in this case also the transparent doped silica glass obtained in the densification absorbs little or no radiation.

A reduction of the content of hydroxyl groups can be effectively produced in the method according to the invention by performing the densification in a flowing gas atomsphere containing chlorine or a chlorine compound, for example, thionyl chloride.

Of course it is possible to perform the method according to the invention in a number of steps, in which in a first step the porous body is not densified, maximally and in a last step it is densified to form transparent, pore-free glass. In this manner it must be possible to obtain a glass having a content of hydroxyl groups which lies in the order of 0.01 ppm, also when the starting product has been obtained by means of a process in which much hydrogen, whether or not bound to the $SiO_2$, is present.

BRIEF DESCRIPTION OF THE DRAWING

An embodiment of the method according to the invention will be described in greater detail with reference to the accompanying drawing. In the drawing

DESCRIPTION OF THE INVENTION

Figure 1:
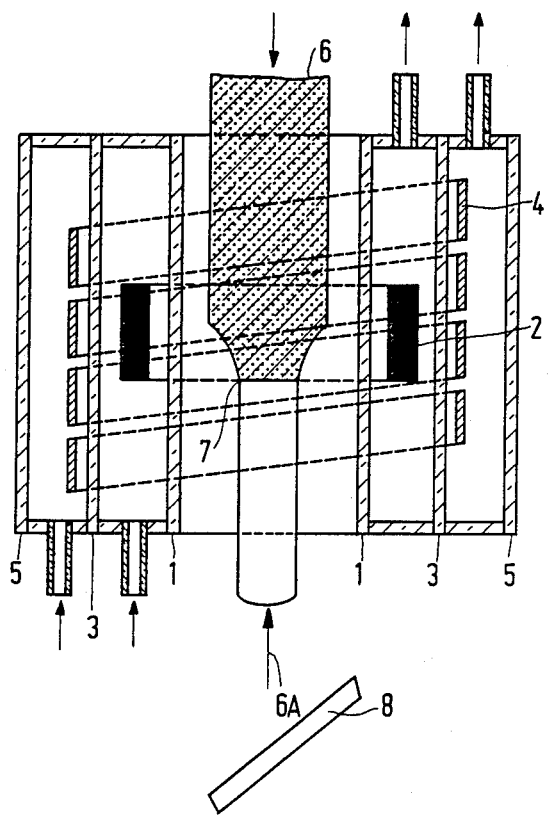
FIG. 1 shows diagrammatically a part of a device for use in an embodiment of a method according to the invention.

The device comprises in principle a silica glass tube 1 and a rotatable annular radiation source 2 of graphite. The radiation source 2 is present in a space bounded by the silica glass tube 1 and a second tube 3 which also consists of silica glass.

The annular radiation source 2 in practice bears on a support present in the space between the tubes 1 and 3 (notshown in the figure to avoid complexity of the drawing) and absorbs little or no energy from the electric field. The support is rotated about its longitudinal axis (not shown). An inert gas is passed through the space enclosed by the tubes 1 and 3. The object of this is on the one hand to dissipate heat of convection and on the other hand to cool tube 1. Ring 2 is heated inductively by means of coil 4 present in a space between tube 3 and tube 5. A coolant, for example demineralised water, can be passed through the space enclosed by the tubes 3 and 5 to cool the tube wall 3. Oil having a sufficiently high electrical resistance (for example, transformer oil) may also be used as a coolant. A porous preform 6 of $SiO_2$ isprovided in the space enclosed by silica glass tube 1 at such a rate that a clear sintering front can form as a result of the radiation emitted by the radiation source 2. Heating by convection of the preform 6 or the sintered part of transparent silica glass 6A is not possible because heat of convection is dissipated via the gas flow through the space between tubes 1 and 3 and the coolant in the space between tubes 3 and 5. The part 6A of transparent silica glass cannot be heated either by radiation of a wavelength $\lambda > 3$ $\mu$m since such radiation if emitted by the radiation source, is absorbed by the silica glass tube 1.

Figure 2:
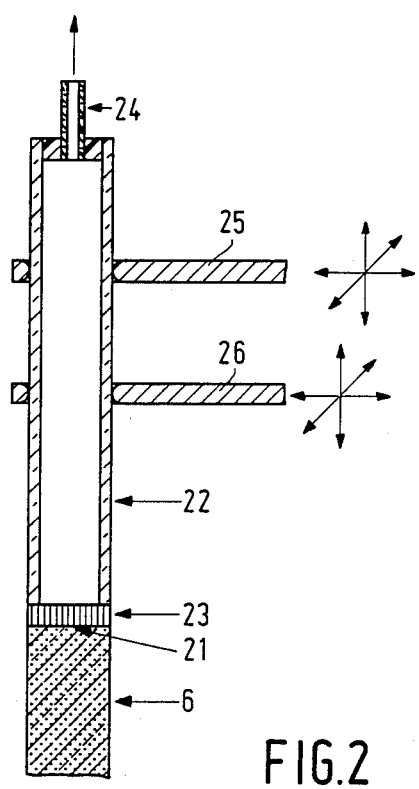
FIG. 2 shows diagrammatically a holding and centering device.

In carrying out the method (see also FIG. 2) a porous body 6 is first of all provided with an end face 21 which is perpendicular to the axis of the body 6, for example, in the form of a solid cylinder consisting of a dried $SiO_2$ gel. A tube 22, for example, of glass, is pressed against the end face 21 and, the tube end facing the face 21, comprising a porous plate 23 which is permanently connected to tube 22. By the outlet 24 a vacuum which is sufficient to hold body 6 against the porous plate 23 is applied in the tube. In the embodiment shown the tube 22 is held by two arms 25 and 26 which, independently of each other, can move, the held part of the tube to the left and to the right in the plane of the drawing and forwards and backwards perpendicular to the plane of the drawing. Both arms 25 and 26 are coupled in so far as the movements upwardly and downwardly in the plane of the drawing are concerned (not shown in the drawing). The porous body 6 is provided in the silica glass tube 1 (FIG. 1) by means of the arms 25 and 26 to move the densification front 7 through the body 6. During densification to position of the body 6 and of the densified part 6A ischecked by mirror 8. The position is corrected, if so necessary, by means of the arms 25 and 26.

What is claimed is:

1. A method of densifying a preformed porous body of an optically transparent glass having a main constituent of $SiO_2$ comprising the steps of applying infrared radiation from a radiation source to a zone of a preformed porous body of an optically transparent glass, said infrared radiation having first wavelengths that are absorbed by said transparent glass and second wavelengths that are not absorbed by transparent glass, said second wavelengths being absorbed substantially in areas of reflection or scattering said preformed porous body;

moving said infrared radiation source and said porous body relative to one another; and preventing said porous body from being heated by at least infrared radiation having wavelengths absorbed by said transparent glass in both a non-densified condition of said body and a condition after densification of said body;

wherein a transparent silica glass screen between the source of infrared radiation and said porous body absorbs infrared radiation having first wavelengths thereby preventing said heating and passes infrared radiation having said second wavelengths, said second wavelengths being smaller than said first wavelengths, and wherein the density of said preformed body is increased by a progressing zone of high temperature when the preformed body and the radiation source are moved relative to each other.

2. A method according to claim 1, wherein said porous body is exposed to said second wavelengths of infrared radiation over said zone, said wavelengths of said infrared radiation being smaller than 3 $\mu$m.

3. A method according to claim 1, wherein said source of infrared radiation is enclosed in a space, said space having inert gas passing therethrough.

4. A method according to claim 3 wherein said space is formed of said screen of silica glass and a further wall beyond said source, said further wall being force-coded.

5. A method according to claim 1, wherein said porous body is rotated about a longitudinal axis.

6. A method of densifying a preformed porous body of an optically transparent glass having a main constituent of $SiO_2$ comprising the steps of applying from a radiation source having a longitudinal axis to a preformed porous body infrared radiation having first wavelengths that are absorbed by optically transparent glass and second wavelengths smaller than wavelengths absorbed by said optically transparent glass and moving said radiation source relative to said preformed porous body in a direction parallel to an axis of said porous body;

preventing said porous body in a non-densified condition or after densification from being heated by at least infrared radiation having said first wavelengths that are absorbed by said optically transparent glass, said step of preventing heating being carried out by a transparent silica glass tube between the infrared source and the porous body that passes radiation having said second wavelengths but prevents passage of radiation having said first wavelengths; and densifying said porous body in said transparent silica glass tube, the radiation forming a sintering front moving through said porous body.

7. A method of densifying a preformed porous body of an optically transparent glass having a main constituent of $SiO_2$ comprising the steps of applying to a preformed porous body having a longitudinal axis infrared radiation by a hollow cylinder radiation source, said infrared radiation having second wavelengths smaller than first wavelengths that are absorbed by said transparent glass, said hollow cylinder radiation source surrounding said porous body and having an axis along said cylinder coinciding with a longitudinal axis of said porous body;

preventing said porous body in a non-densified condition or after densification from being heated by convection and infrared radiation having said first wavelengths absorbed by said optically transparent glass, said step of preventing heating being carried out by a transparent silica glass tube between the infrared source and the porous body that passes radiation having said first wavelengths;

rotating said hollow cylinder about said axis of said hollow cylinder and moving said porous body and said hollow cylinder with respect to each other in a direction along said longitudinal axis and said axis of said hollow cylinder; and densifying said porous body in said transparent silica glass tube, the radiation forming a sintering front moving through said porous body.

* * * * *